(12) United States Patent
Gredinger

(10) Patent No.: US 9,503,697 B2
(45) Date of Patent: Nov. 22, 2016

(54) DIGITAL CAMCORDER ANGLE DISPLAY VIEWER DEVICE WITH AN ADD-ON PROTECTIVE COVER FOR A MOBILE DEVICE AND METHOD FOR TRANSPORTING COMPONENTS THEREOF

(71) Applicant: Ronen Gredinger, Hollywood, FL (US)

(72) Inventor: Ronen Gredinger, Hollywood, FL (US)

(73) Assignee: Ronen Gredinger, Hollywood, FL (US)

( * ) Notice: Subject to any disclaimer, the term of this patent is extended or adjusted under 35 U.S.C. 154(b) by 18 days.

(21) Appl. No.: 14/678,289

(22) Filed: Apr. 3, 2015

(65) Prior Publication Data
US 2016/0295173 A1  Oct. 6, 2016

(51) Int. Cl.
*H04N 5/225* (2006.01)
*H04N 7/18* (2006.01)
*H04N 5/232* (2006.01)

(52) U.S. Cl.
CPC ............ *H04N 7/185* (2013.01); *H04N 5/2256* (2013.01); *H04N 5/23293* (2013.01)

(58) Field of Classification Search
CPC ............................ H04N 7/185; H04N 5/2256
USPC ......................................................... 348/376
See application file for complete search history.

*Primary Examiner* — Usman Khan

(57) ABSTRACT

This invention, a digital camcorder angle display viewer device for a mobile device can continuously capture and present video images of the environment in front of the user when connected to a flexible, flip style protective cover with similarities of a book. By capturing present video images of the user's pathway, the device's user continuously can be aware of the environment beyond the device's display while multitasking using the mobile device. This device makes it comfortable for the user to look at the mobile device while glancing at the video camcorder angle viewer screen which is provided parallel to the mobile device to see what is in front of the user while the user is walking and simultaneously looking down towards the ground at a 45 degree angle. The video camcorder screen can continuously be a live and current video image of the view seen by the camcorder lens at any given moment. Consequently, the device's user is less likely to collide with or stumble over an object while operating the user's mobile device functions.

44 Claims, 8 Drawing Sheets

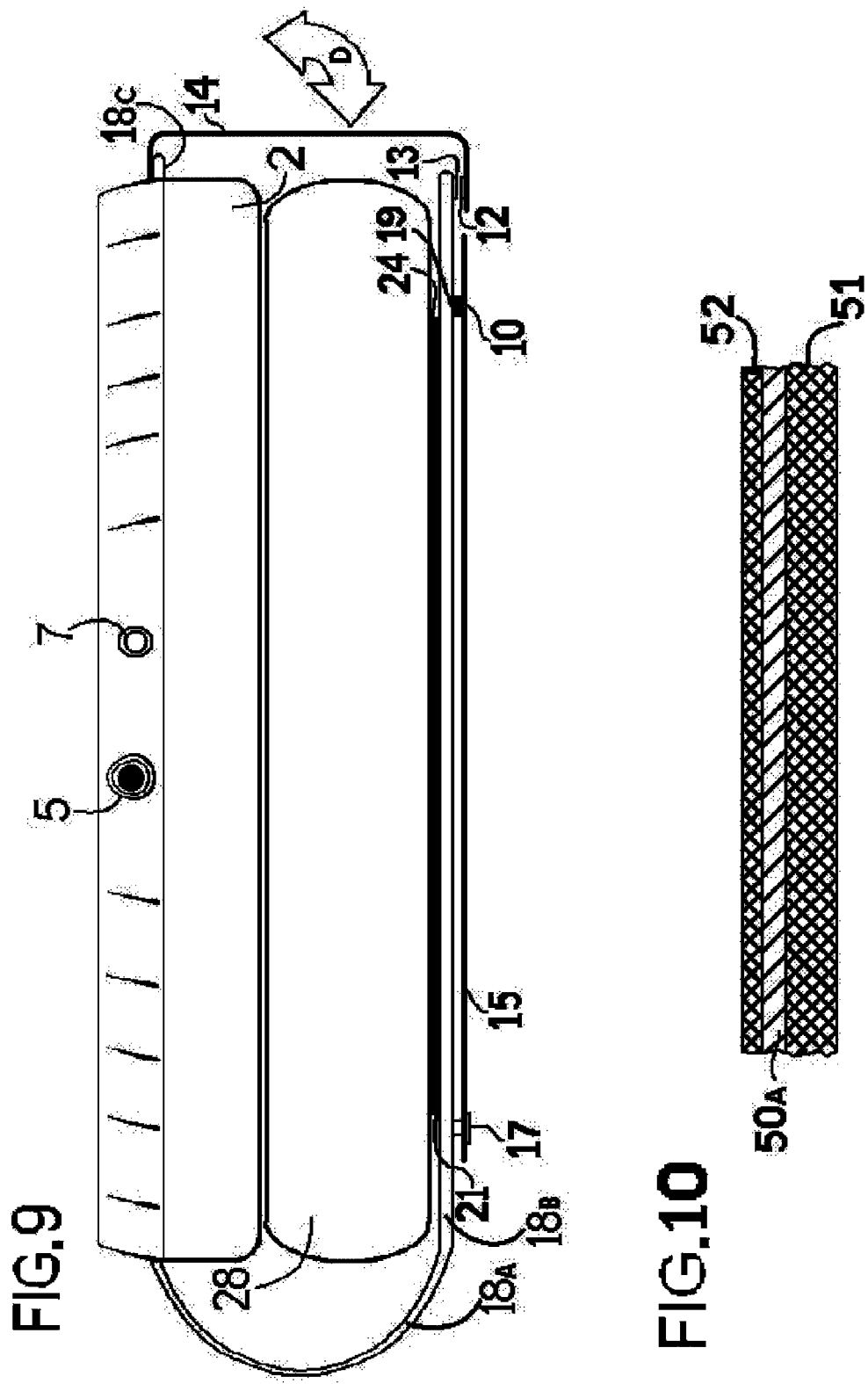

DIGITAL CAMCORDER ANGLE DISPLAY VIEWER DEVICE WITH AN ADD-ON PROTECTIVE COVER FOR A MOBILE DEVICE AND METHOD FOR TRANSPORTING COMPONENTS THEREOF

BACKGROUND OF THE INVENTION

1. Field of the Invention

This invention relates to mobile communication devices, more specifically to accessories for handheld mobile devices. These accessories will easily capture the front circumstance pathway of the user and present the corresponding image on a video screen which will be beside user's mobile device when the user lowers his head to view the handheld mobile device while either walking, standing, or sitting.

2. Related Art

Mobile device users who are currently engaged in viewing and operating their mobile devices can find themselves in a rather unique predicament. Because they are constantly using mobile devices, those users often will be in motion. For example, it is common, even if not entirely safe, for a mobile device user to engage in operating the mobile device's functions while the user is concurrently walking. Due to the visual nature of operating the mobile device's functions, a user usually looks down at the mobile device while walking, such a user often will find it difficult to divide attention between the user's mobile device screen and the user's environmental surroundings because the user has to look up every now and then to see where the user is going. A user who is walking while operating the mobile device functions may inadvertently collide with or stumble over objects in the user's path because the user's attention was focused on the user's mobile device digital screen instead of the path that the user was traversing. Even if a user remains stationary while participating in a text messaging session, that user may be exposed to some amount of danger or potential embarrassment if the user is so engaged with the device's display that the user becomes oblivious to changes in surrounding environment of the user. People usually don't watch where they are walking when using their mobile devices because they are looking down at their mobile device screens when holding their mobile device generally a little more than one foot away from their face at a 45 degree downward angle. This invention is specifically designed to let people view their mobile devices while temporarily glancing at the video camcorder angle viewer's display which is placed parallel from the person's mobile device's screen, in order to let that person who is walking while looking down and viewing, sending a text, or accessing the internet on their mobile device at the same time. So that the person can see where they are going while walking, all while viewing through the video camcorder angle viewer's display the path in front of that person. The user is able to view the front pathway a lot faster than lifting their head to view the front pathway, when surrounding environments change so suddenly, every moment counts to be aware of the user's changing surroundings.

SUMMARY OF THE INVENTION

With the above and other objects in view, a video camcorder angle viewer according to the present invention comprising of a device can be made out of magnesium alloy, polycarbonate compound, glass fiber, and/or plastic. It is described as a rectangular prism which is a long and flat housing with narrow sides and two major sides. All the corners on the housing are curved. The rear major side has a top area which extends out to form a horizontal triangle shaped ridge are, this area is where the optical lens and small light is positioned, which is adjacent from the long and flat housing. The optical lens and light are on the triangle ridge slope closest to the top edge of the video camcorder device, the slope is on a 45 degree angle adjacent from the long and flat housing area of the video camcorder device. This small light is used in relation to the optical lens in order for the optical lens to view scenery in low lit or dark places, both the small light and optical lens are parallel and separated from each other by roughly a half an inch. The optical lens and the small light are pointed away from the video camcorder device housing, and both optical lens and light are pointed in the same direction.

The triangle shaped ridge area located in the rear top area of video camcorder device allows the small light and the optical lens to be raised at a 45 degree angle adjacent from the long, flat housing area in order to point away from the video camcorder device's long and flat housing for user to see a view of the surroundings in front of user which is done by the optical lens viewing constant images which are electronically transmitted by internal electronic parts to provide the digital video screen on the major front side of the device's housing. The front pathway view can only be seen by user when user holds the present invention at a 45 degree from the corresponding flat ground. This view that the user sees on the video screen is the exact view from which the optical lens observes. This digital video screen is located on the front major panel for displaying constant images which originate from the optical lens, the video display screen takes up the majority of the front panel area of the video camcorder device, below the screen are three buttons, there is also one button on one narrow side of the video camcorder angle device, and another button on the opposite narrow side, these buttons are used to control different aspects of the viewer device. This video camcorder angle device is not much different than the normal portable pocket camera, except that the video camcorder angle device is wider, the digital screen may be larger than the normal portable pocket camcorder, it only takes constant moving images, the video camcorder angle device is permanently attached with an adhesive to a book style protective cover, and also that the optical lens on the present invention is fixed at a 45 degree angle from the flat housing of the normal portable pocket camcorder. This video camcorder angle viewer works in relation to a book style protective cover and both the video camcorder angle viewer device along with the book style protective cover are accessories that work in relation to a mobile device.

In an implementation, the book style protective cover is made from a neoprene material. Neoprene provides cushioning and shock absorption for the attached device which the cover protects. However, in other implementations, other materials can be used including silicone, rubber, fabric, and many others. Other examples of case material include vinyl, plastic, thermoplastic, cloth, leather, artificial leather, synthetic leather, synthetic leather made of plastic (sometimes referred to as pleather), poromeric imitation leather, koskin, and leatherette. The handheld mobile device would be inserted into a plastic mobile device fitted case, and the mobile device case is temporally attached to the book style protective cover. Mobile device and mobile device case is not provided with the video camcorder angle device and leather book style protective cover. The video camcorder angle viewer and leather book style protective cover are accessories to the mobile device which would be inside mobile device fitted case. This video camcorder angle viewer device will work properly when all accessories are joined together with mobile device and mobile device case. Each accessory conjoined would be integral in the achievement of constantly viewing of the user's pathway while user is looking downward at user's mobile device.

Although the foregoing disclosure has been described in detail by way of illustration and example for purposes of clarity and understanding, it will be recognized that above objects described in this invention may be embodied in numerous other specific variations and embodiments without departing from the spirit or essential characteristics of the disclosure, since there are different sized mobile device phones, this also relates to the digital video camcorder angle viewer device which can be in restructured to obtain simplicity and electronic effectiveness. Certain changes and modifications may be practiced, and it is understood that the disclosure is not to be limited by the foregoing details, but rather is to be defined by the scope of the appended claims. The main concept of the present invention will show no tendency to change or fluctuate.

BRIEF DESCRIPTION OF THE FIGURES

FIG. 9 is an above schematic diagram of the present invention with all components together in the closed position.

FIG. 10 is a schematic diagram of the local structure of the protective cover.

DETAILED DESCRIPTION OF THE PREFERRED EMBODIMENTS

Figure 1:
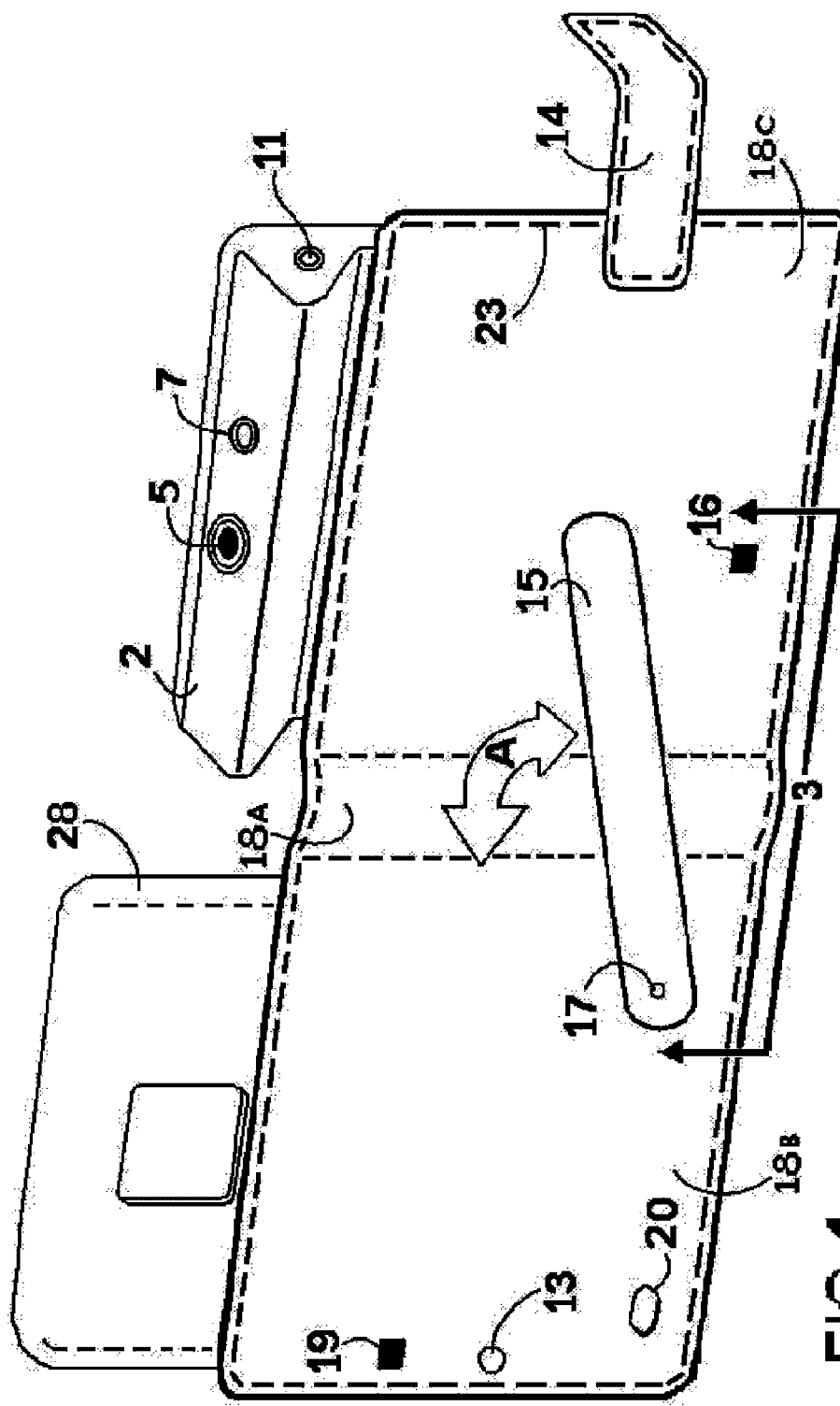
FIG. 1. is an elevated rear angle view of the present invention.

FIG. 1 is the elevated rear angle perspective of an embodiment of the present invention, the first component presents a utility model of the book style folding protective cover 18 in the open position. The three main sections—(a protective cover front 18C, a protective cover back 18B, and a protective cover flexible spine 18A)—that make up the "book" like structure of the cover 18. Said protective cover front 18C, the cover connecting flexible spine 18A, and mobile device protective cover back 18B are connected together in that order. Said book style protective cover 18 is formed from by cutting a large rectangle from selected flexible material. The main body length of said book style protective cover 18 in its entirety is larger than the width of the digital video camcorder angle viewer device 2 and the width of said mobile device case 28 when both items are side by side separated by roughly an inch. The body size of said book style protective cover back 18B and protective cover front 18C are equal to each other in length, width, and depth. The width of said protective cover front 18C is a little larger than the width of said angle viewer device 2. Protective cover front 18C is always in correlation with said angle viewer device 2, and said protective cover back 18B is always in correlation with said mobile device case 28. The width of said mobile device protective cover back 18B is a little larger than the width of said mobile device case 28. Said viewer device 2 will have the same width as most mobile devices. Said book style protective cover back 18B and protective cover front 18C when parallel to each other but separated by roughly an inch, this inch portion width area describes said protective cover flexible spine 18A, all three cover areas have the same height and all three sections are apart of said book style protective cover 18 as a whole, which will be equal to the distance of said book style protective cover 18 width in its entirety. With all three said protective cover areas 18A, 18B, and 18C mentioned, is the description of the size of said book style protective cover 18 in its entirety.

Along all the edges of said book style protective cover 18 has multiple thread stitching 23 sewn in, in order to keep the material from peeling and adds sturdiness, two vertical parallel lines of said multiple thread stitching 23 are positioned in the middle area of said protective cover 18, said thread stitching 23 is used in conjunction with adhesive (shown in FIG. 6) in order to keep in place internal two inner layer plates (shown in FIG. 6) which are parallel to each other. Said protective cover flexible spine 18A is the only area to not have an inner layer plate (shown in FIG. 6), which makes said protective cover flexible spine 18A able to bend. Said multiple thread stitching 23 also is sewn along the edges of strap 14 in order to keep material from peeling and sturdiness. Stitching 23 along with adhesive (not shown) also allows said strap 14 to be permanently attached to the middle area along the border of the edge of protective cover front 18C, on the outer section of protective cover front 18C. Said strap 14 has a magnet (shown in FIG. 2) glued on with adhesive (shown in FIG. 6) to the opposite side of said strap 14 which is used to secure said book style protective cover 18 when folded closed, said magnet (shown in FIG. 2) located on strap 14 is temporally connected to magnet 13 which is located on opposing end which is glued to the outer surface of leather book style protective cover 18. Located on the rear side of said book style protective cover 18 on the bottom center area near the edge, is a hard thin edge plastic elongated stick 15, which is shown in a diagonal direction. elongated stick 15 is a thin hard plastic piece with rounded edges which has two main faces and a narrow thin edge, said elongated stick 15 also has a small pierced hole on left side center area. Parallel to hole in said elongated stick 15 is a pierced hole (shown in FIG. 3) in said book style cover 18 inside both holes is a rivet 17 which permanently attaches said plastic elongated stick 15 to said book style cover 18. Applying force by turning said elongated stick 15 counter clockwise which is illustrated by arrow A.

A first small Velcro square 19 is one third of a set, the third of the small Velcro square set 10 (shown in FIG. 7) which is it's counterpart that temporally connects two pieces of Velcro set together. Said third small Velcro square counterpart 10 (shown in FIG. 7) which is glued to the hidden side of said elongated stick 15 near the right edge of the stick. Said elongated stick 15 can be temporally joined to first small Velcro square 19 after user applies force to turn said elongated stick 15 counter-clockwise as illustrated with arrow A in order to not have stick hanging loosely when said book style cover 18 is in the closed position. Once user opens said book style protective cover 18 then user can apply force to turn said elongated stick 15 clockwise as illustrated with arrow A. Once said book style cover 18 is fully open, said elongated stick 15 temporally connects by sticking on to the second small Velcro square 16 which is part of a Velcro set. Said second piece of Velcro square 16 is glued on to said protective cover 18C parallel with said rivet 17. When said elongated stick 15 with said third piece of Velcro set 10 (shown in FIG. 7) located on the back side of said elongated stick 15 will allow said elongated stick 15 to temporally connect to said second piece of the Velcro set 16, this will secure said book style protective cover 18.

Figure 3:
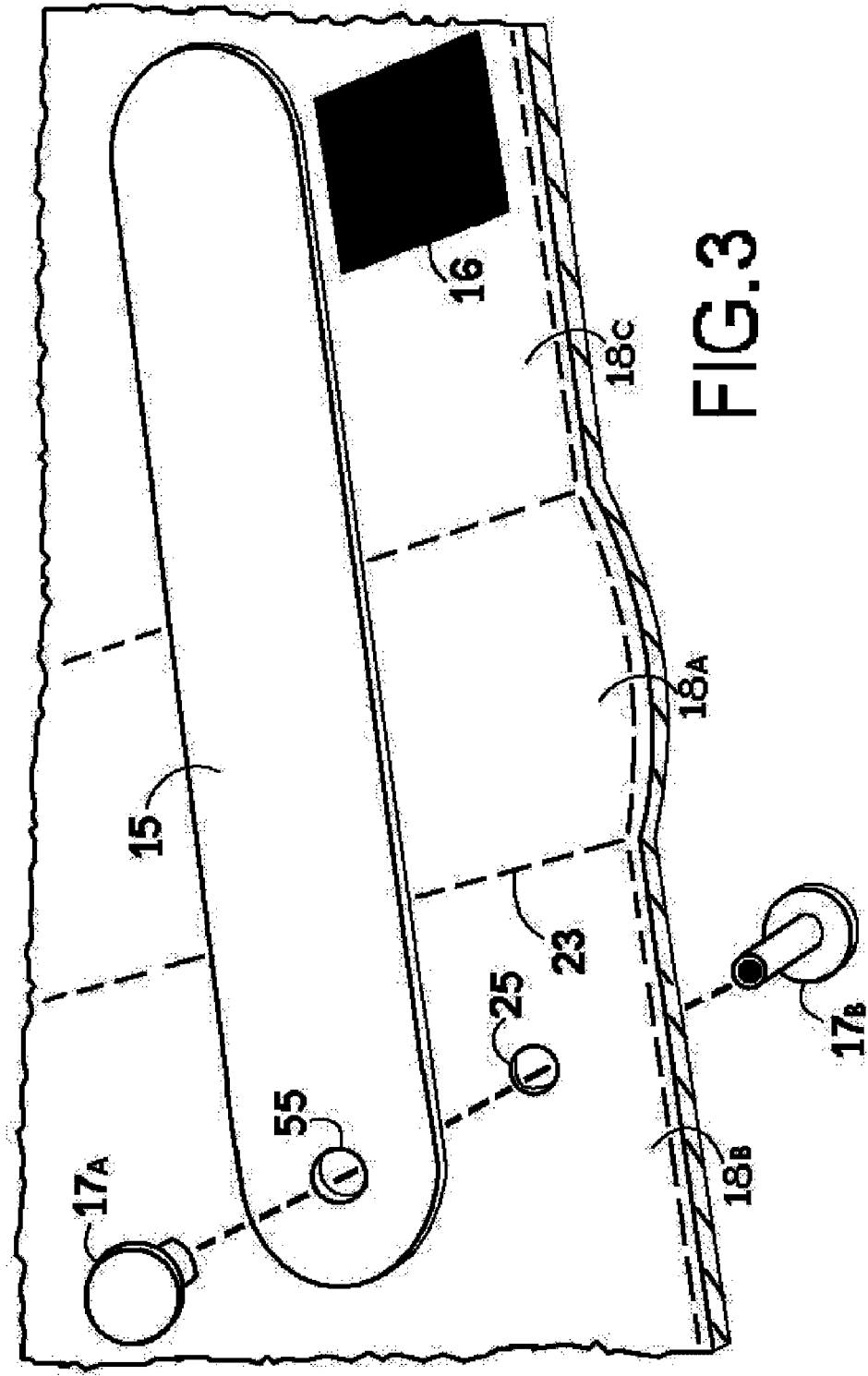
FIG. 3 is an underside close-up angle view of the rear middle bottom area of the book style protective cover with most parts separated.

Plastic elongated stick 15, rivet 17, and said second piece of the Velcro square set 16 (are shown in a close up illustration in FIG. 3 as described with the space in between the two arrows). The first and second identical pieces of Velcro squares glued on the protective cover are the "loop fastener" parts of Velcro, and the third piece of Velcro square glued on the elongated stick is the "hook fastener" part of Velcro. Said rivet 17 and said second piece of Velcro set 16 are horizontally parallel and positioned on the lower center area of said book style cover 18, the space in between said rivet 17 and said second piece of Velcro set 16 is roughly 3 inches or can be a little more than 3 inches, and the length of said elongated stick 15 is a little larger than the length of the distance between said rivet 17 and said second piece of Velcro set 16.

Preventing said book style cover 18 from folding will allow both mobile device (not shown) inside mobile device case 28 and said camcorder angle viewer device 2 to be level and parallel with each other for both components to relate to each other. Said book style protective cover's 18 body width is smaller in size compared to said mobile device case 28 and said angle viewer device 2 in order for the top area of both mobile device camera (not shown) and said angle viewer device 2 to be unobstructed, which allows the triangle ridge portion of said angle viewer device 2 to extend beyond the protective cover 18, and also allows camera lenses at different regions of different mobile devices when inserted into mobile device case 28 to be unobstructed. Lower small hole 20 on said book style protective cover 18 is for mobile device speaker (not shown) to be unobstructed at all times. Due to the fact that mobile devices come in different sizes and there are speakers in different areas of mobile devices and different parts of mobile devices need to be clear of any obstruction, said book style protective cover 18 can be custom made with holes with different sizes in different areas of said book style protective cover 18. Mobile device case 28 is temporally attached with two components of Velcro (not shown) which temporally connect together, to the right side of said protective cover 18 as shown in in the illustration of FIG. 1. Velcro (not shown) has two components in which one Velcro part 24 (shown in FIG. 5) is glued to the back of mobile device case 28, while the other Velcro component (shown in FIG. 4) is glued to the hidden side of said leather book style protective cover 18.

Parallel with mobile device case 28 is said video camcorder angle viewer device 2, which is mostly hidden behind said book style protective cover 18 except for the top area. Said camcorder angle viewer device 2 is glued on permanently with a strong adhesive (shown in FIG. 6) beside the mobile device case 28 which both parts are separated by roughly an inch on said protective cover 18. Said camcorder angle viewer device 2 top rear area extends out to form a horizontal triangle shaped ridge area adjacent to the housing of said camcorder angle viewer device 2 for the optical lens 5 and small light 7 to be positioned adjacent from the long, and flat housing of said camcorder angle device 2. The optical lens 5 and small light 7 are on the slope facing the top edge of said video camcorder device 2, the slope is on a 45 degree angle from the long, flat housing area of the video camcorder angle device 2. Both said optical lens 5 and light 7 have internal parts located inside said housing of angle device 2 except for portions of said optical lens 5 and said light 7 are protruding through said housing with cut holes in said housing. This small light 7 is used in relation to the optical lens 5 in order for the optical lens 5 to view scenery in low lit or dark places, which corresponds when user turns on said small light 7 by pressing small circular light button 11 once. Said small circular light button 11 is provided nearest to said small light 7 on the top portion area on the outer narrow edge of said angle viewer device 2, in order to turn off and on said small light 7, light button 11 has to be pressed once to turn on said small light 7, and a second time to turn off said small light 7. Both the small light 7 and optical lens 5 are parallel and pointed in the same direction separated from each other by roughly a half an inch. The optical lens 5 and the small light 7 are pointed opposite from the video camcorder angle device 2. The triangle shaped ridge area located in the rear top area of angle device 2 allows the small light 7 and the optical lens 5 to be raised at a 45 degree angle from the long and flat housing area in order to point opposite from the said angle device's 2 long and flat housing. Said optical lens 5 is a small optical lens most familiar with camera lenses associated with mobile devices.

Figure 2:
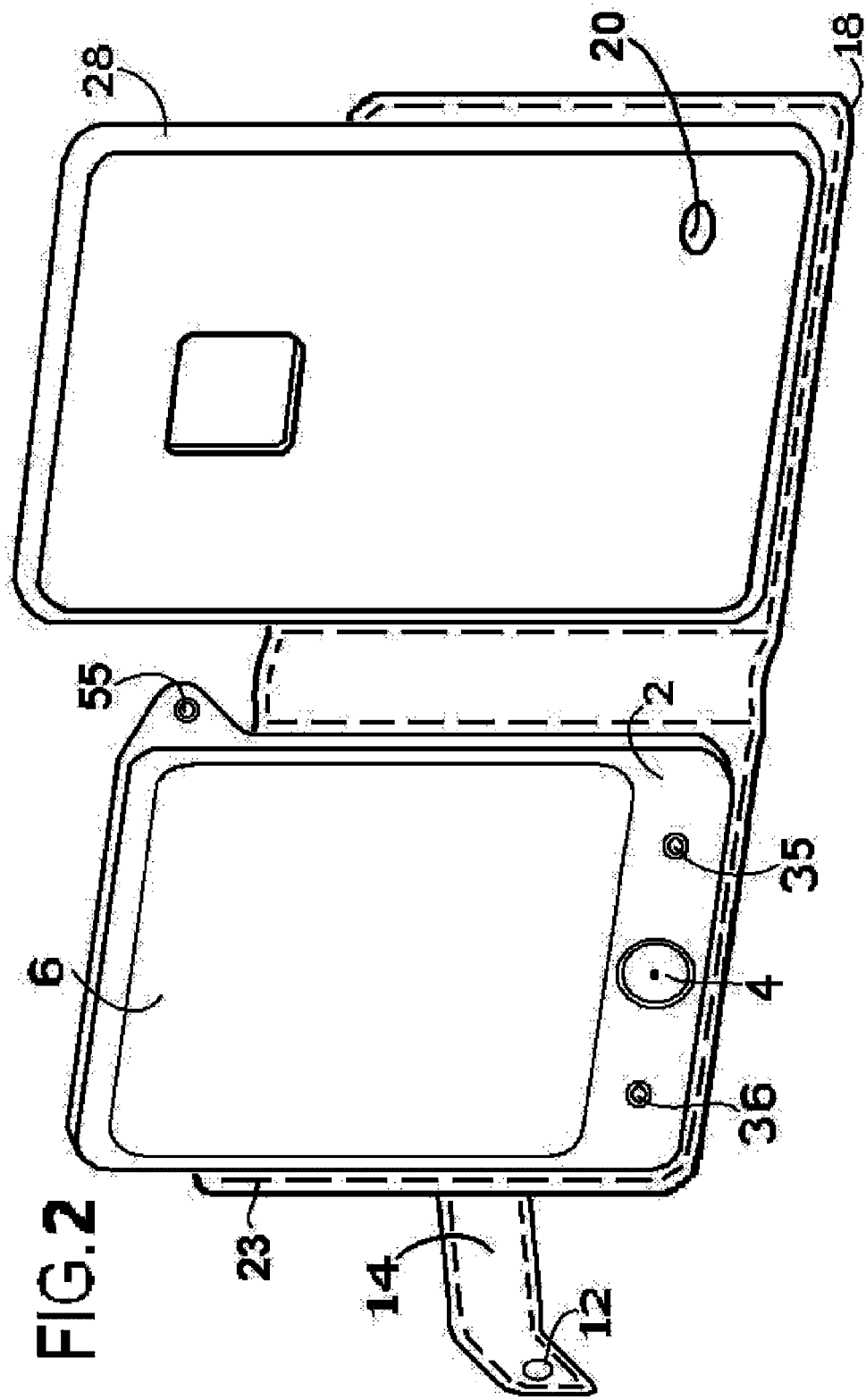
FIG. 2. is an elevated front angle view of the present invention.

FIG. 2 is an elevated front angle illustration of another embodiment of the present invention, which includes a rectangular digital video camcorder angle viewer device 2 comprising of a generally rectangular prism, with more detail, said angle device 2 is a long and flat rectangular housing which includes curved corner members and an opposite face with an extended horizontal triangular ridge portion located on the top of said opposite face, and said housing encloses internal parts. Said camcorder angle viewer device 2 contains a primary face which is flat and has rounded edges on every corner of the whole housing. A flat digital video screen or display 6 is disposed on the upward primary face to constantly view the user's pathway. The size of said display screen 6 may be different sizes concerning length and width. On/off large circular button 4 is located on the bottom center of the primary face of said housing of the angle viewer device 2, just below said screen 6, said on/off large circular button 4 for turning on the power of said device 2 by pressing once, for turning off the power of said device 2, user has to press said on/off large button 4 a second time. Said screen's 6 view of user's pathway is set at a default zoom level. Device small circular recording button 36 is provided to the left of said on/off button 4 on the same primary face of said camcorder angle viewer device 2, which is used to turn on and off recording of images projected from optical lens. Said small circular light button 55 is provided nearest to said optical lens 5 on the top right portion area on the outer narrow edge of said camcorder angle viewer device 2, in order to turn on and off playback of said recording, only after recording is turned off and stored in Memory chip (shown in FIG. 8). Once recording is shut off by pressing recording button 36, it is automatically stored in the memory chip (shown in FIG. 8) The recording time could range from a half hour to one hour, or even more time can be allowed for recording, depending on the size of memory in the memory chip (shown in FIG. 6). Recording has to be stopped in order delete button 35 is pressed once, said delete button 35 is a small circular button which is positioned to the right side of said on/off power button 4. Pressing said delete button 35 is necessary to erase stored recording in memory chip (shown in FIG. 8).

The dash lines throughout the borders of said book style protective cover 18 represents thread stitching 23, said stitching 23 is also represented in two parallel vertical dash lines positioned in the middle of said book style protective cover 18. Stitching 23 is sewn along each side and corners of said book style protective cover 18, and along the sides and corners of said strap 14. Mobile device case 28 shown to the right side of the illustration which is represented by a large rectangle, and the inside of said mobile device case 28 is symbolized by dotted circles and dotted squares, said mobile device case 28 is purchased by the user separately, it is not included with invention but is attached temporally to book style protective cover 18, mobile device case 28 is displayed to show how mobile device phone (not shown) when inserted into mobile device case 28 is related to present invention. Both said angle viewer device 2 and said mobile device case 28 are parallel with each other separated by roughly an inch and located in front of said book style protective cover 18. The top areas of both said angle viewer device 2 and said mobile device case 28 are extended beyond the top border of said book style protective cover 18. Mobile device case's 28 camera top hole is above the border of said book style protective cover 18, in order not to block mobile device camera (not shown) when mobile device (not shown) is inserted into mobile device case 28.

The lower hole 20 located at the lower right area of protective cover 18 and mobile device case 28 (best seen in FIG. 1). This illustration is for unblocking the mobile device speaker (not shown) when mobile device (not shown) is inserted into mobile device case 28. Attached on the left side of said book style protective cover 18 in FIG. 2 illustration is said strap 14, which is connected to by said stitching 23 and adhesive (not shown) to the outer surface of said book style protective cover 18. Said strap 14 has small circular magnet 12 glued on with industrial strength adhesive (shown in FIG. 6). Said magnet 12 is one half of two magnets used for closing said book style protective cover 18 to the other magnet 13 (shown in FIG. 1) is located on other opposite end and glued on to the outer surface of said book style protective cover 18, both magnets would temporally connect together when said book style protective cover 18 closes (best seen in FIG. 9). All corners on said book style protective cover 18 including said strap 14 have rounded corners. The main body length of said book style protective cover 18 is larger than the width of said angle viewer device 2 and the width of mobile device case 28 when both items are side by side separated by roughly an inch. The inch separation is the area that bends and closes said book style protective cover 18 in which both said angle viewer device 2 and said mobile device case 28 meet in the middle front face to front face when said book style protective cover 18 closes.

FIG. 3 is a schematic diagram of a further embodiment in an underside close-up angle view of the rear middle area of said book style protective cover 18. Said plastic elongated stick 15, said rivet 17, said second piece of the Velcro square set 16, and said book style protective cover 18, all parts are separated from each other except for said second piece of Velcro 16 is glued to said protective cover 18. Rivet half 17A and rivet half 17B make up rivet 17 as a whole, which both half's are shown in this illustration, separated in two pieces, preferably before both half s of said rivet 17 is attached to other items are first in two pieces, before a rivet gun tool can permanently attach rivet to items. FIG. 3 illustration is illustrating said rivet 17 in the earlier stage before rivet components are permanently attached to each other in combinations with attaching said elongated stick 15 to said protective cover 18. Pierced hole 25, is formed in said mobile device protective cover back 18B, in order for the two pieces of said rivet 17 to be permanently attached to said protective cover area 18B. A hole 55 is pierced in said plastic elongated stick 15 on the left side in the center said elongated stick 15. Said two pieces of said rivet 17 are inserted into said hole in elongated stick 15 and said pierced hole 25 in said protective cover back 18B combine said stick 15 and protective cover back 18B permanently together, which are both squeezed together between said two pieces of said rivet 17, when two pieces of said rivet are permanently squeezed together with a rivet gun tool, only leaving miniscule room for movement of elongated stick 15 to turn clockwise or counter-clockwise. Said elongated stick 15 with said third piece of Velcro set 10 (shown in FIG. 7) located on the back side of said elongated stick 15 will allow said elongated stick 15 to temporally connect to said second piece of the Velcro set 16, this will secure and prevent book style protective cover 18 from folding closed. The length of said elongated stick 15 is parallel to the bottom edge of said book style protective cover 18 when said elongated stick 15 is temporally connected to said second piece of the Velcro set 16.

Figure 4:
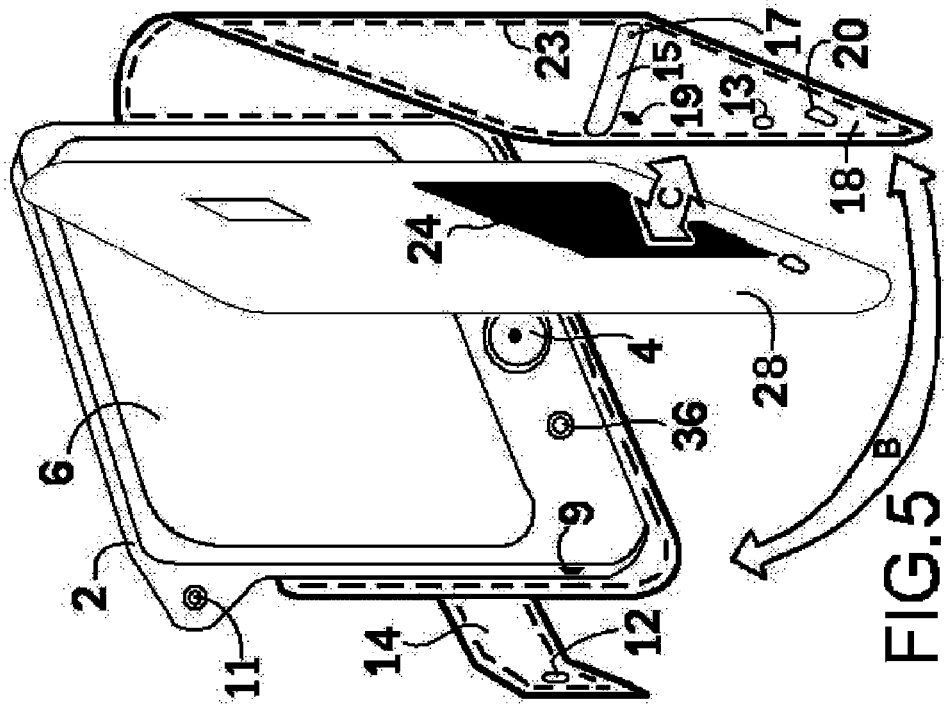
FIG. 4 is an elevated front angle of the present invention when invention is partially closed and mobile device fitted case is unattached.
Figure 5:
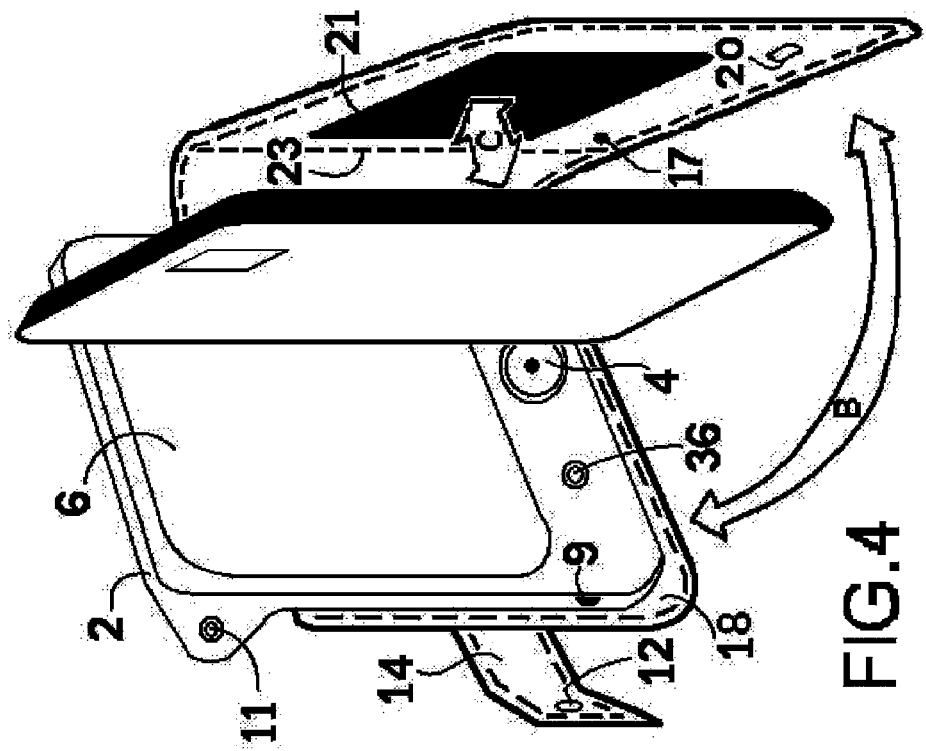
FIG. 5 is an another elevated front angle of the present invention when invention is partially closed and mobile device fitted case is unattached.

FIG. 4 and FIG. 5 are front perspectives of an embodiment of the present invention in an elevated front angle, comprising of said video camcorder angle viewer device 2 and said book style protective cover 18 is partially folded closed as shown with arrow B. Said arrow B indicates the movement to which said book style protective cover 18 can fold open and fold closed when forced by user. Once said book style protective cover 18 is closed, then said strap 14 wraps around opposite end of said book style cover 18 with protruding magnet 12 which is glued on to said strap 14, with industrial strength adhesive (shown in FIG. 6). When present invention is folded closed said magnet 12 temporally attaches to protruding relative magnet 13 (shown only in FIG. 5) which is glued on the opposite outer surface near the edge of said protective cover back 18B. Said book style protective cover front 18C and protective cover back 18B are able to fold closed with said cover flexible spine 18A connected in the middle of protective cover front 18C and protective cover back 18B. Said video angle viewer device 2 comprising of a long and flat housing with the exception of the top back area of device which extends out in a shape of a horizontal triangle ridge near the top of the housing. Said camcorder angle viewer device 2 contains internal parts with a primary face which is flat and has a screen or display 6 which is disposed on the upward primary face.

The on/off large circular power button 4 is provided on the bottom center of the primary face of said housing of the angle viewer device 2, just below said screen 6, said on/off large circular power button 4 is for turning on the power of said device 2 by pressing once, for turning off the power of said angle viewer device 2 by pressing button second time. The small recording circular button 36 is provided to the left of said on/off button 4, used for turning on and off recording of said optical lens 5. On the left narrow side edge located close to the bottom is a port 9 for charging said angle viewer device 2 and further up along the narrow edge nearest to the top is said light switch 11 for turning on and off said small light 7 (shown in FIG. 2) which is provided on horizontal triangle portion of the rear of said angle viewer device 2. Said angle viewer device 2 is in glued on permanently with a strong adhesive (shown in FIG. 6) to said protective cover front 18C on the inner surface, which is provided behind said device 2. Glued with industrial strength adhesive (shown in FIG. 6) to the inner surface of said protective cover back 18B is the first half of a large square set of Velcro 21 (shown only in FIG. 4). Said Velcro 21 is one half of a set, the second half of the large Velcro square 24 (shown only in FIG. 5) which is glued on the back of mobile device case 28 (shown only in FIG. 5), each half of the large Velcro squares are relative to each other in order for mobile device case 28 to be temporally attached to the inner surface of said protective cover back 18B. Said first half of a large Velcro square 21 is "loop fastener" part, said second half of the large Velcro set 24 is the "hook fastener" part. Movement of easy temporally attachable mobile device case 28 to said book style cover 18 can be shown with arrow C (seen in FIG. 4 and FIG. 5) when forced by user.

Along the borders of both sides said book style cover 18 has stitching 23, and close to the bottom right area corner of said protective cover back 18B is hole 20 used to not obstruct mobile device speaker (not shown) on some mobile devices (not shown). Rivet 17 (shown in FIG. 4 and FIG. 5) is relative in connecting said protective cover back 18B to attached elongated stick 15 (shown only in FIG. 5) through a hole 25 (shown in FIG. 3) cut in said protective cover back 18B. Said first piece of small Velcro square 19 (shown only in FIG. 5) is glued close to the edge on the outer surface of said protective cover back 18B above said magnet 13. Said one piece of small Velcro square 19 which would temporally attach to it's counterpart Velcro square (shown in FIG. 7) which is hiding behind said elongated stick 15.

Figure 6:
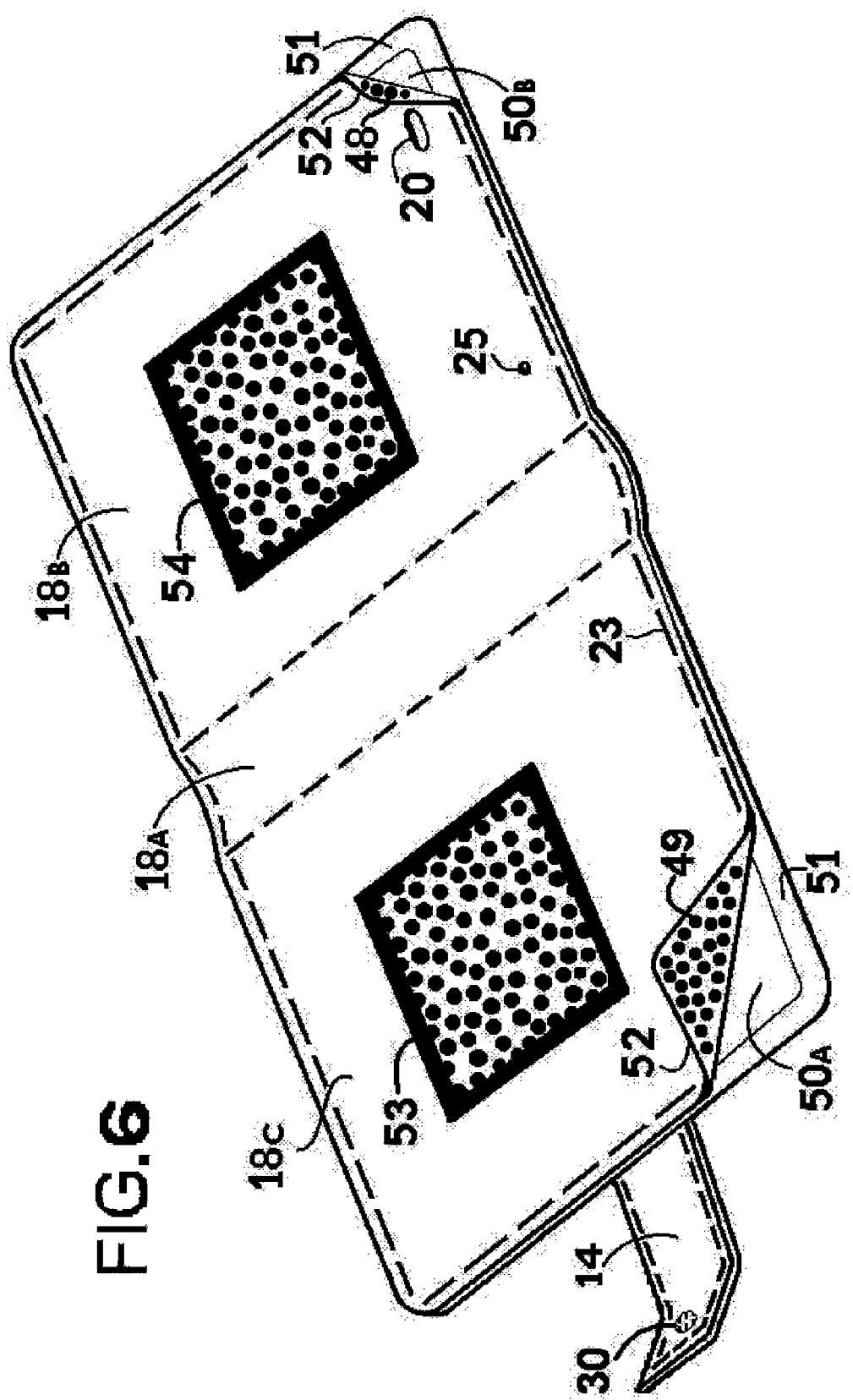
FIG. 6 is an elevated front angle view of a book style protective cover without other relative parts.

FIG. 6 is a pictorial depiction of an elevated front angle view of an embodiment of said book style protective cover 18 in the open position without all other relative parts. All the parts of said book style protective cover 18 are comprising of multiple materials, which includes an outer surface 51 (best seen in FIG. 9), which is the surface that is exposed when the cover is in an open position, and an inner surface 52 (best seen in FIG. 9), which is the surface that is exposed when the cover is folded closed. The inner surface 52 is in contact with angle viewer device 2 when the angle viewer device 2 is attached with a strong adhesive 53. Adhered in between the outer and inner surface materials is a rigid plastic board material 50A and 50B (or other thin rigid material), which gives said protective cover back 18B and protective cover front 18C their rigidity. The outer and inner surfaces are glued and sewn together with stitching 23 to form the two main section structures, consisting of the device protective cover front 18C, and the mobile device protective cover back 18B.

Said protective cover flexible spine 18A is the area in between protective cover back 18B and protective cover front 18C which does not have a rigid plastic board material inside, in order to make said protective cover flexible spine 18A able to bend. Two insulating inner layers plates 50A and 50B may be made of an ordinary thin plastic panel or another material which is ridged, and they are both identical in rectangle size, both inner layers plates 50A and 50B are a smidge smaller than said protective cover back 18B and protective cover front 18C. Said insulated layer plate 50A is glued in between said outer surface 51 and said inner surface 52 which makes up protective cover front 18C, while said layer plate 50B is glued in between said outer surface 51 and said inner surface 52 which makes up said cover back 18B. Each panel is glued and stitched in with said stitching 23 sewn along the borders of all said cover sections 18A, 18B, and 18C. The left inner layer plate's 50A corner can be seen by unraveling thread from said inner surface 52 and said outer surface 51, located on the left side and shows adhesive 49 that holds said insulated plate 50A secure. On the right corner of said mobile device protective cover back 18B, provided is the insulated layer plate 50B, said inner layer plate's 50B corner can be seen by unraveling thread from said inner surface 52 and said outer surface 51, and said inner surface 52 is lifted up to reveal said insulated layer plate 50B hidden underneath said inner surface 52, and shows adhesive 48 that holds said insulated plate 50B secure.

Along all the edges of the whole protective cover 18 has thread stitching 23 sewn in, in order to keep insulated layer plate 50A and insulated layer plate 50B secure in between inner surface 52 and outer surface 51, stitching 23 also prevents said protective cover 18 from peeling and adds sturdiness. Said strap's 14 length is a little over two inches with a width of about one inch, stitching 23 also is sewn along the edges of said strap 14. Stitching 23 connects one width side of said strap 14 to the main body of the outer surface 51 of said cover front 18C, one width side of said strap 14 is glued and sewn on to the outer surface of said device protective cover front 18C near the middle of the side edge, near the opposite edge of said strap 14 has a small spot of industrial strength glue 30 in order for said magnet 12 (shown in FIG. 2) to be glued to said strap 14. Pierced hole 25, is formed in said protective cover front 18C, in order for said rivet 17 (shown in FIG. 3) to be permanently attached to said protective cover 18C. Pierced hole 25, is formed in said protective cover back 18B, which allows for said rivet 17 (shown in FIG. 3) to be inserted into said pierced hole 25. Industrial strength glue area 53 is glued on the inner surface 52, in the center of said protective cover front 18C, attached to industrial strength glue area 53 is said video camcorder angle viewer device 2 (shown in FIG. 2). Industrial strength glue area 54 is glued on the outer surface 52, in the center of said cover back 18B, attached to adhesive area 54 is said first half of a set of a large Velcro square 21 (shown in FIG. 4). Close to the bottom right area corner of said cover back 18B, is a small hole 20 used to not obstruct mobile device speaker (not shown) on some mobile devices (not shown). This illustration makes visible the adhesive areas 53, 30, 54 to which other related components can permanently attach to.

Figure 7:
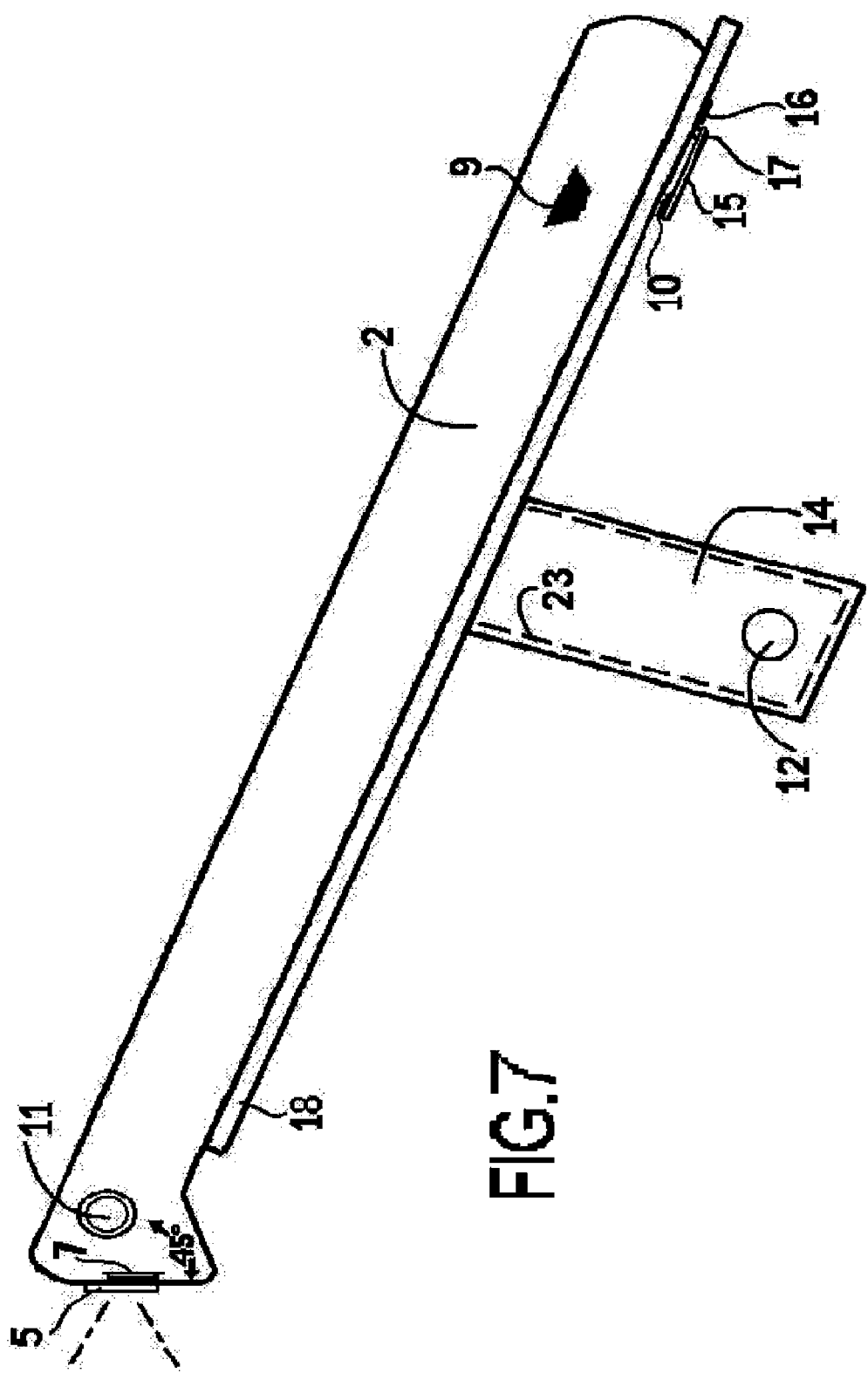
FIG. 7 is a side view of the present invention on an 45 degree angle.

FIG. 7 is a close-up pictorial depiction of a side perspective of an embodiment of the present invention on a 45 degree slant, including a video camcorder angle viewer device 2 and said book style protective cover 18. This illustrates both accessories on a 45 degree angle. This 45 degree slant relates to the horizontal ground which would be the usual direction a user will hold their mobile device (not shown) along with said angle viewer device 2 and said book style protective cover 18 while walking, standing, and sometimes sitting. When user holds mobile device (not shown), said rivet 17 is permanently connecting said protective cover 18 to said plastic elongated stick 15, and in turn said elongated stick 15 would temporally connect on to said second piece of the Velcro set 16. Said second piece of the Velcro set 16 is glued on to said protective cover 18 parallel with said rivet 17. When said elongated stick 15 with said third piece of a Velcro set 10 located on the back side of said elongated stick 15 will allow said elongated stick 15 to temporally connect to said second piece of the Velcro set 16, this will secure said book style protective cover 18 and said angle viewer device 2 to be parallel and level with corresponding mobile device (not shown) when inserted into mobile device case 28 (shown in FIG. 2).

With the slant view of FIG. 7 the description of the top and bottom edges of said angle viewer device 2 are slightly curved. Said angle viewer device 2 has a top rear area forming a triangular ridge so when user raises said angle viewer device 2 at a 45 degree angle illustrated with arrow located at the top right of FIG. 7 illustration, this allows the optical lens 5 and small light 7 to be at a vertical position which in turn allows the user to view the corresponding image of front circumstance pathway of the user on a digital video screen 6 (shown in FIG. 2) of said angle viewer device 2, while looking slantways downward. The dash dotted lines in front of said optical lens 5 represents the particular area that said optical lens 5 will view. Near to the bottom on the narrow edge of said angle viewer device 2 is a charging port 9 used in collaboration with a power charger for charging said internal battery (shown in FIG. 8). The power charger can be the typical chargers used in other usual pocket camera devices, power charger is not supplied. Said strap 14 has stitching 23 sewn along the borders of said leather strap 14 to keep leather from peeling and establish sturdiness. Close to the edge of said strap 14 furthest away from said protective cover 18, which is a small magnet 12 glued on with a strong adhesive (shown in FIG. 6) to the middle of said leather strap 14, these combined parts are used for securing said angle viewer device 2 and mobile device (not shown) inside mobile device case 28 (shown in FIG. 2) when said protective cover 18 is folded closed. Said second piece of a set is a small Velcro square 10 which is glued to said elongated stick 15 on the side facing said protective cover 18 in the top corner area near the edge of said elongated stick 15. Said second piece of Velcro 10 is one third of a set, the first piece of the Velcro square 19 (seen in FIG. 5) which is glued to the opposite end, located on the outer surface top portion of said book style protective cover 18. Each third of the Velcro squares set are relative to each other in order for said elongated stick 15 to be turned clockwise or counterclockwise with force by user.

Figure 8:
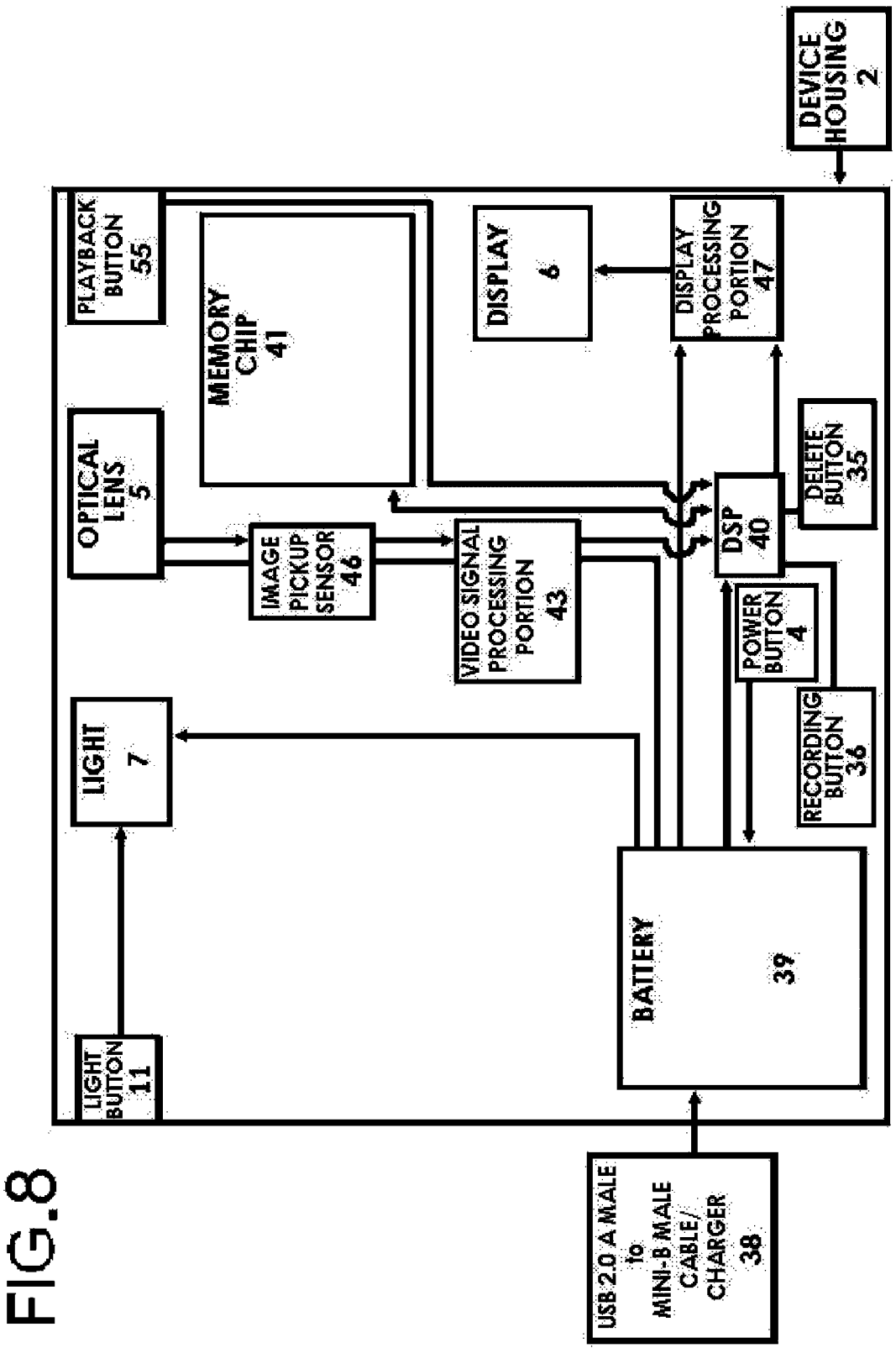
FIG. 8 is a block diagram of the components inside the housing of the device in accordance with the present invention.

Referring to FIG. 8, a block diagram is shown for components of said viewer device 2 in accordance with the present invention. The blocks indicated in FIG. 8 may be implemented in software, hardware or a combination of both. Said viewer device 2 includes circuitry with different features. These features are preferably implemented using hardware such as integrated circuit chips (ICs). Memory 41 may include as much memory as permitted by space constraints of said viewer device 2. In one embodiment, at least 10 Gbits of memory is supplied. More or less memory may be provided as needed. The image captured by the said optical lens 5 is fed to a digital signal processor (DSP) 40 where predetermined image processing is performed. Further, the image data is temporarily stored in memory chip 41. Said optical lens 5 is an assembly of a small lens, an image pickup sensor, circuits and connectors. The images data received by the digital signal processor (DSP) 40 is stored in memory chip 41 of the viewer device 2. At the same time, the received image may also be displayed on an LCD or monitor 6 of the viewer device 2. Note that the images stored in the memory chip 41 can also be transferred onto an external recording medium such as a hard drive, by means of USB 2.0 A male to Mini-B male Cable/Charger 38, which also can double as a charger for battery 39. USB 2.0 A male to Mini-B male Cable/Charger 38 is not provided with present invention. Said DSP 40 may include a conventional microprocessor, such as those employed in higher end personal digital assistants (PDAs). Advantageously, the present invention is not limited by memory capacity or power as is often a problem with PDAs. The present invention can employ slower chips such as a 25 MHz (or higher) since computations are minimal.

Power button 4 is pressed once for turning on device 2, and then pressed again for turning off device 2, said power button 4 electrically connects with battery 39. Said battery 39 is electrically connected to DSP 40, light 7, and display processing portion 47. Said display processing portion 47 is electrically connected to display 6. Said battery 39 is electrically connected to video signal processing portion 43, and video signal processing portion 43 is electrically connected to image pickup sensor 46. Image pickup sensor 46 is electrically connected to optical lens 5. Light 7 can be turned on and off by said light button 11 at the discretion of the user. Light button 11 can be turned on by pressing light button 11 once, and can be turned off by pressing light button 11 a second time. Display 6 includes a plurality of pixels arranged in a pixel array. Pixels may be activated by transistors located on said display 6, for example thin film transistors. Pixels are preferably active matrix pixels, however other display types may be suitable. DSP 40 may provide for pixel addressing in accordance with memory 41. Recording of moving images is stored in said memory chip 41 by first pressing recording button 36, recording is stopped once recording button 36 is pressed a second time. The moment the recording is stopped, the recording is automatically transferred to said memory chip 41. Recording allotted timeframe can be between a half an hour to one hour. A memory chip with a larger size capacity can be provided when in production, for allowing a longer recording timeframe. Recording can be deleted by pressing the delete button 35 once, only after recording is stopped. Memory chip 41 is retrieved and displayed on display 6 of said viewer device 2, when playback button 55 is pressed. To start playback of recorded images press the playback button 55 once, and to stop playback of recording images, press the playback button 55 a second time. Playback of recording can only be activated when recording has been stopped and transferred to said memory chip 41.

In image taking, an object image is imaged through the optical lens 5 on the image pickup sensor 46 and subjected to photoelectric conversion in the image pickup sensor 46. An electric signal obtained by the photoelectric conversion in the image pickup sensor 46 is converted into a video signal by the video signal processing portion 43. The video signal is supplied to the DSP 40 and converted into a video compression digital signal. As the compression system, known technologies such as JPEG system and MPEG system can be used for handling moving images, respectively. The video signal is displayed on the display screen 6 through the display processing portion 47.

FIG. 9 is an above perspective of an embodiment of the present invention attached to said mobile device case 28 in the closed position. Once said book style cover 18 is closed, then said strap 14 wraps around opposite end of said mobile device protective cover back 18B as described with illustration arrow D. Said arrow D shows the two directions said strap 14 can move when forced by user. Said strap 14 is permanently connected by said stitching 23 and glued to said device protective cover front 18C on the outer surface 51. When present invention is folded closed, said magnet 12 temporally attaches to protruding relative magnet 13 which is glued on the opposite rear side near the edge of said protective cover front 18C, this procedure helps secure closing of said protective cover 18. The top area of said video angle viewer device 2 is a straight edge top which leads to a slope above the edge, said slope is part of the horizontal triangle ridge portion, this slope is at a 45 degree angle adjacent to the long and flat housing of said viewer device 2, on said slope is said optical lens 5 and said light 7.

Top area of angle viewer device 2 extends beyond said protective cover back 18C. Part of said protective cover front 18C is hidden from said slope of triangle edge portion of said angle viewer device 2. Glued with industrial strength adhesive (shown in FIG. 6) to the inner surface 52 area of said protective cover back 18B is said first half of a set of Velcro 21, in a shape of a square. Said first Velcro square 21 is one half of a set, the second half Velcro square 24 which is glued on the hack of mobile device case 28, each half of the Velcro squares are relative to each other in order for mobile device case 28 to be temporally attached to the inner surface 52 of said protective cover back 18B. Said cover flexible spine 18A is this only area of said protective cover 18 that can bend. Said mobile device case 28 and said angle viewer device 2 meet together when said cover 18 is folded closed, in order for all components of present invention in combination with mobile device phone (not shown) inserted into mobile device case 28 to be collapsed. Small rivet 17 is relative in connecting said cover back 18B to attached elongated stick 15 through a hole 25 (shown in FIG. 3) cut in said cover back 18B. Said first piece of small Velcro square set 19 is glued close to the edge on the outer surface of said protective cover back 18B. Said first piece of small Velcro square 19 which would temporally connect said third piece which is the counterpart Velcro square 10 which is hiding behind said elongated stick 15. This procedure is all for keeping said elongated stick 15 not hanging loosely when temporally attached to said cover back 18B when present invention is in a closed position.

FIG. 10 illustrates a schematic diagram of the local structure of a section of said device protective cover area 18C in an extremely close-up side view perspective. Said device protective cover area 18C which is a conjunction of an insulating inner layer 50A squeezed between two layers (main outer surface layer 51, inner cover surface layer 52) that make up part of the "book" like structure of said protective cover 18 for further details. In the utility model of the above embodiment, shown in FIG. 10. FIG. 10 shows said main outer surface layer 51, the insulating layer 50A and said inner cover surface layer 52. Preferably, said outer surface layer 51 and said inner cover surface layer 52 may be made of leather. However, in other implementations, other materials can be used including silicone, rubber, fabric, and many others. Other examples of case material include vinyl, plastic, thermoplastic, cloth, neoprene material, artificial leather, synthetic leather made of plastic (sometimes referred to as pleather), poromeric imitation leather, koskin, and leatherette. The insulating layer plate 50A may be made of an ordinary thin plastic, thermoplastic, and other materials which make the material rigid or hard to bend.

The inner cover surface layer 52 may be made of soft materials such as fine fibers, having a thickness of about 0.2 mm. The insulating inner surface layer 50A may be made of a thin plastic or material that would be ridged or hard to bend but yet lightweight, with about a thickness of 0.4 mm. The main outer surface layer 51 may be made of a thick leather or material similar to the flexibility of leather that could bend, with about a thickness of 0.8 mm. Of course, this is only the utility of new preferred embodiments only, all parts of said protective cover 18 before the protective cover can also be made from other materials, and have other thicknesses. Said insulating layer plate 50A is secured in place between said main outer surface layer 51 and said inner cover surface layer 52 with adhesive 49 (shown in FIG. 6) and sewn together with stitching 23 (shown in FIG. 6). The method of which all components that make up said device protective cover area 18C as described previously in FIG. 10 also holds true for the method of components which make up said protective cover back 18B (shown if FIG. 1). Thickness of all above objects in certain changes and modifications may be made, and it is understood that the disclosure is not to be limited by the foregoing details, but rather is to be defined by the scope of the appended claims.

The invention claimed is:

1. A digital camcorder angle display viewer device with an add-on protective cover selectively associated with a handheld mobile device, comprising:
   a rectangular prism housing having opposing first and second major faces and narrow borders which also includes curved corner members, and an extended horizontal triangular ridge portion near the top width border of the rectangular housing situated on the second major face to enclose internal parts;
   an optical lens disposed on the housing on the extended horizontal triangular ridge's slope closest to the top border of the housing on the second major face which is set at a 45 degree angle adjacent to the long and flat housing area of the digital video camcorder device;
   a small light disposed on the horizontal triangular ridge slope closest to the top border of the device set at a 45 degree angle adjacent to the long and flat housing area of the digital video camcorder device;
   a display screen located on the major face, which displays a plurality of reduced images of the recorded output signal on a single screen;
   a recording module which records an output signal of the imaging module on a recording medium;
   a playback setting that is used for playback of recorded moving images on the display screen;
   a direct current power supply provided inside the housing to power the digital display, the processing unit, the internal memory, the image pickup sensor and light;
   a camcorder's application software to use an internal memory to store digital video footage including video images captured by the image pickup sensor;
   an imaging module which converts object image into an electric signal;
   displaying a large circular button which is provided on the bottom center portion of the housing upon the first major face of the housing for powering on and off the digital video camcorder device;
   displaying a first small circular button which is provided on the bottom left portion of the housing upon the first major face of the housing for recording moving images;
   displaying a second small circular button which is provided on the bottom right portion of the housing upon the first major face of the housing for deleting recording stored in memory;
   a third small circular button is provided on the narrow side at the top corner of housing left of the display screen, the small round button is for powering on and off the small light;
   a fourth small circular button is provided on the narrow side at the top corner of housing right of the display screen, the round button is for powering on and off the playback of recording;
   a charging port positioned on the narrow lower left side of the display screen, used for inserting generic chargers with mobile devices, charging port is able to fit another type of cable including an USB 2.0 A male to mini-B male cable which is able to be used for downloading recording to other devices;
a protective cover for mounting a digital video camcorder device and temporally mounting a handheld mobile device case made of leather or similar material thereof;
an internal cover surface of the protective cover;
an outer cover surface of the protective cover;
two identical rectangle inner layer plates;
a front area of the protective cover;
a back area of the protective cover;
a flexible vertical spine area of the protective cover;
a pierced oval hole through the protective cover;
a first half of a large Velcro square-shaped pair which is a loop fastener part;
a second half of the large Velcro square-shaped pair which is a hook fastener part that connects to the first same size Velcro part;
interwoven thread;
industrial strength adhesive;
two small identical Velcro square loop fastener parts;
a small same size Velcro square hook fastener, which is a counterpart to the two Velcro squares thereon;
a small rivet;
a small circular hole pierced through protective cover;
a thin plastic elongated stick;
industrial strength adhesive;
interwoven thread;
a flexible strap; and
two same size small circular magnets which temporally connect to one another.

2. The digital camcorder angle display viewer device with an add-on protective cover recited in claim 1, wherein the digital video camcorder device is a digital camcorder capturing only moving images.

3. The digital camcorder angle display viewer device with an add-on protective cover recited in claim 1, wherein the optical lens is able to view and electrically transmit moving images of the front pathway to the display screen.

4. The digital camcorder angle display viewer device with an add-on protective cover recited in claim 1, wherein the digital video camcorder device further comprises a display processing portion for directly displaying the detection result on a display screen of the digital video camcorder device.

5. The digital camcorder angle display viewer device with an add-on protective cover recited in claim 1, further comprising:
the moving images shown on a display is recorded when activated by user;
the first small circular button is pressed once which corresponds to an on mode for the recording; and
the first small circular button is pressed a second time which corresponds to an off mode for the recording.

6. The digital camcorder angle display viewer device with an add-on protective cover recited in claim 1, further comprising:
the recorded moving images are stored in a built-in memory chip of the digital video camcorder device;
wherein once the recorded moving images are stopped, the recording is automatically stored in a built-in memory chip; and
wherein the recording time varies from a half hour to one hour recording time, which may be increased by increasing the capacity of the built-in memory chip.

7. The digital camcorder angle display viewer device with an add-on protective cover recited in claim 6, wherein the detection result sent to an external memory in a computer or a server is done by the user utilizing a wired transmission.

8. The digital camcorder angle display viewer device with an add-on protective cover recited in claim 5, wherein recorded moving images can chose to be deleted by user pressing a second small circular delete button once.

9. The digital camcorder angle display viewer device with an add-on protective cover recited in claim 1, wherein the digital video camcorder device is directly supplied with electricity by a battery located inside the housing.

10. The digital camcorder angle display viewer device with an add-on protective cover recited in claim 1, further comprising:
a battery which is electrically charged from an outside power source by means of transmitting direct current through a generic charger wire with an electrical outlet plug;
wherein one end of the generic charger is inserted into a charging port on the digital video camcorder device, and
wherein the opposite end of the generic charger will plug into an electrical outlet.

11. The digital camcorder angle display viewer device with an add-on protective cover recited in claim 1, wherein charging port is able to fit another type of cable including an USB 2.0 a male to mini-B male cable which is able to be used for downloading recording to other devices.

12. The digital camcorder angle display viewer device with an add-on protective cover recited in claim 1, wherein a small light is used to efficiently light the front pathway when in a dark area.

13. The digital camcorder angle display viewer device with an add-on protective cover recited in claim 1, further comprising:
a third small circular button is used by pressing button once, which corresponds to an on mode for the small light; and
a third small circular button is used by pressing a second time, which corresponds to an off mode for the small light.

14. The digital camcorder angle display viewer device with an add-on protective cover recited in claim 1, further comprising:
a large circular button is pressed once which corresponds to an on mode for the digital video camcorder device; and
the first small circular button is pressed a second time which corresponds to an off mode for the digital video camcorder device.

15. The digital camcorder angle display viewer device with an add-on protective cover recited in claim 1, further comprising:
the moving images shown on the display screen which is stored in the built-in memory chip can playback on the display screen when activated by user;
wherein the process for playback mode would require pressing a fourth small circular button once, which corresponds to an on mode; and
wherein pressing the same fourth small circular button a second time corresponds to an off mode for the playback of recorded images.

16. The digital camcorder angle display viewer device with an add-on protective cover recited in claim 1, wherein the protective cover is able to fold open and closed, similar to the style of a book.

17. The digital camcorder angle display viewer device with an add-on protective cover recited in claim 1, wherein the second major face of the digital video camcorder device housing is permanently mounted to the inner cover surface with industrial strength adhesive on the side of the protective cover front area.

18. The digital camcorder angle display viewer device with an add-on protective cover recited in claim 1, further comprising:
   industrial strength adhesive is applied to the inner cover surface in the middle side area of the side parallel with the digital video camcorder device; and
   wherein the first half of the large Velcro square is permanently attached to the inner cover surface in the location where industrial strength adhesive is applied to.

19. The digital camcorder angle display viewer device with an add-on protective cover recited in claim 1, wherein the second half of the large Velcro square-shaped pair is glued with industrial strength adhesive on to the rear middle area of the handheld mobile device case.

20. The digital camcorder angle display viewer device with an add-on protective cover recited in claim 1, wherein each half of a Velcro pair temporally connects to each other for the handheld mobile device case to be temporally attached and unattached to protective cover back area on the inner cover surface.

21. The digital camcorder angle display viewer device with an add-on protective cover recited in claim 1, further comprising:
   two identical inner layer plates are positioned parallel by each length border with an inch between each layer plate;
   wherein both identical inner layer plates are secured in place in between the inner and outer cover surface with interwoven thread and glue; and
   wherein both identical inner layer forms the protective cover front and back areas of the book style protective cover rigid.

22. The digital camcorder angle display viewer device with an add-on protective cover recited in claim 1, further comprising:
   a flexible vertical spine which is an inch between the inner layer plates can bend similar to the style of a book to close;
   wherein the protective cover in a closed position enables the handheld mobile device and the digital video camcorder device to meet face to face, which compacts all components represented; and
   wherein the protective cover in the open position is able to have both devices' displays to be parallel as well as visible and accessible to the user.

23. The digital camcorder angle display viewer device with an add-on protective cover recited in claim 1, further comprising:
   interwoven thread is stitched along all the borders along with two vertical lines of interwoven thread is sewn into the middle protective cover in order to secure the two inner plastic plates; and
   wherein interwoven thread is stitched in to prevent peeling of the outer and inner surface of the protective cover which is made of leather or material similar to leather.

24. The digital camcorder angle display viewer device with an add-on protective cover recited in claim 1, wherein the top horizontal triangular ridge area of the digital video camcorder housing extends beyond the top border of the protective cover front area in order to not obstruct the optical lens and small light disposed on the horizontal triangle ridge area.

25. The digital camcorder angle display viewer device with an add-on protective cover recited in claim 1, wherein the handheld mobile device case top area extends above the top border of the protective cover back area in order to not obstruct the camera hole on the mobile device case.

26. The digital camcorder angle display viewer device with an add-on protective cover recited in claim 1, further comprising:
   an oval hole is pierced in the lower corner area of the protective cover to not block sound originating from mobile device; and
   wherein the oval hole is pierced in a different section of protective cover, contingent on the different types of mobile devices which have different areas in which speakers are positioned.

27. The digital camcorder angle display viewer device with an add-on protective cover recited in claim 1, wherein an elongated stick is a thin hard plastic piece with rounded edges which has two main faces, a narrow thin edge, and a small circular pierced hole which is located close to of one end of the elongated stick.

28. The digital camcorder angle display viewer device with an add-on protective cover recited in claim 1, wherein the small rivet has two parts which combine together with assistance from a rivet gun to form the small rivet as whole.

29. The digital camcorder angle display viewer device with an add-on protective cover recited in claim 1, further comprising:
   a small rivet permanently attaches elongated stick by penetrating small hole in elongated stick and a small hole in protective cover;
   wherein positioning one end of the flat surface of the elongated stick and flat outer surface of the protective cover parallel with just enough room for the elongated stick to move in two directions; and
   wherein elongated stick's two directions of movement is either clockwise or counter-clockwise, when forced by the user.

30. The digital camcorder angle display viewer device with an add-on protective cover recited in claim 1, wherein a first small "loop fastener" Velcro piece is glued on with industrial adhesive to the outer cover surface area of the protective cover, placed near the top corner, relative to the area behind the mobile device case.

31. The digital camcorder angle display viewer device with an add-on protective cover recited in claim 1, wherein second small "loop fastener" Velcro piece is glued on with industrial adhesive to the outer cover surface area of the protective cover, placed near the bottom, relative to the area behind the video camcorder device.

32. The digital camcorder angle display viewer device with an add-on protective cover recited in claim 1, wherein a third small "hook fastener" Velcro piece is glued on with industrial adhesive to the elongated stick near the edge of the stick on the opposite end of the rivet area, placed on the elongated stick side facing the protective cover.

33. The digital camcorder angle display viewer device with an add-on protective cover recited in claim 1, further comprising:
   wherein an elongated stick with attached third small Velcro square temporally connects to the second small Velcro square which is glued to the protective cover; and wherein the elongated stick is turned clockwise to keep the protective cover open and level preventing the protective cover from bending in any direction.

34. The digital camcorder angle display viewer device with an add-on protective cover recited in claim 1, further comprising:
    wherein an elongated stick with attached third small Velcro square temporally connects to the first small Velcro square glued on the outer surface of the protective cover back area; and
    wherein an elongated stick is turned counter-clockwise which secures elongated stick from hanging loosely when the protective cover is in the closed position.

35. The digital camcorder angle display viewer device with an add-on protective cover recited in claim 1, further compromising:
    an interwoven thread stitched along borders of the flexible strap along with adhesive enables one end of a flexible strap to be permanently attached to the outer surface of the protective cover in the middle area along the edge of the outer cover surface;
    wherein the other end of the flexible strap extends beyond the border of the protective cover, and
    wherein the unattached end of the flexible strap hangs loosely when not in use.

36. The digital camcorder angle display viewer device with an add-on protective cover recited in claim 1, wherein the end section of the flexible strap which is not attached to the protective cover has one magnet glued on the side facing the digital video camcorder device.

37. The digital camcorder angle display viewer device with an add-on protective cover recited in claim 1, wherein the second corresponding magnet is glued to the middle area near the opposite edge of protective cover, on the outer cover surface.

38. The digital camcorder angle display viewer device with an add-on protective cover recited in claim 1, further comprising:
    wherein the flexible strap is able to bend in two opposite directions;
    wherein the flexible strap surrounds the opposite end of the protective cover outer cover surface where both magnets temporally connect; and
    wherein the flexible strap prevents protective cover from opening while protective cover is in a closed position.

39. A method of operating a digital camcorder angle display viewer device with an add-on protective cover, comprising steps of:
    arranging a handheld mobile device inserted into a mobile device case;
    arranging a mobile device case attaching to a protective cover;
    arranging an elongated stick with Velcro, which is permanently connected by a small rivet to a protective cover;
    positioning the digital video camcorder device's display and the mobile device's display parallel and combing with the protective cover;
    capturing a front sight image from an optical lens when the digital video camcorder device is held in a 45 degree slant relative to the horizontal ground;
    monitoring a display screen which shows the front pathway in a plurality of reduced images of the recorded output signal on a single screen;
    displaying obstacles in the users pathway while user is looking at a 45 degree angle downwards instead of looking straight ahead in order for user not to bump into objects in user's pathway;
    in response to both devices' displays positioned side by side allows the user to multitask between both viewable screens while user is looking downward at the combined devices;
    multitasking by the user between both devices' displays positioned parallel which is able to be done by the permanently attached elongated stick with glued on Velcro which temporally connects to the Velcro counterpart glued on the outer surface of the protective cover in order to prevent the digital camcorder angle display viewer device from hanging loosely; and
    in response to permanently attached elongated stick securing protective front and back cover area from bending enables stableness for all components to be level when held with one hand.

40. The method recited in claim 37, wherein the user's pathway captured by the optical lens and displayed on the screen facing toward the user's eyes, when the user holds the digital video camcorder device at 45 degree slant from the corresponding flat ground.

41. The method recited in claim 37, wherein the user is aware of situations or obstacles in user's pathway much faster, while user is standing, walking, or sitting and looking downward at a 45 degree slant from the corresponding flat ground much faster then raising user's head horizontal to view situations or obstacles.

42. The method recited in claim 37, further comprising the steps of:
    inserting a handheld mobile device into mobile device fitted case; and
    positioning the mobile device and the fitted case to one side of the inner surface of the protective cover back area by means of two corresponding half pieces of Velcro temporally attaching.

43. The method recited in claim 37, wherein the digital video camcorder device is glued to the parallel area of the inner surface of the protective cover front area, parallel to the mobile device case.

44. The method recited in claim 41, wherein the palm of the user's hand is able to hold all corresponding components combined while user's thumb on the same hand is able to operate the mobile device's touchscreen.

* * * * *